Patented Sept. 25, 1951

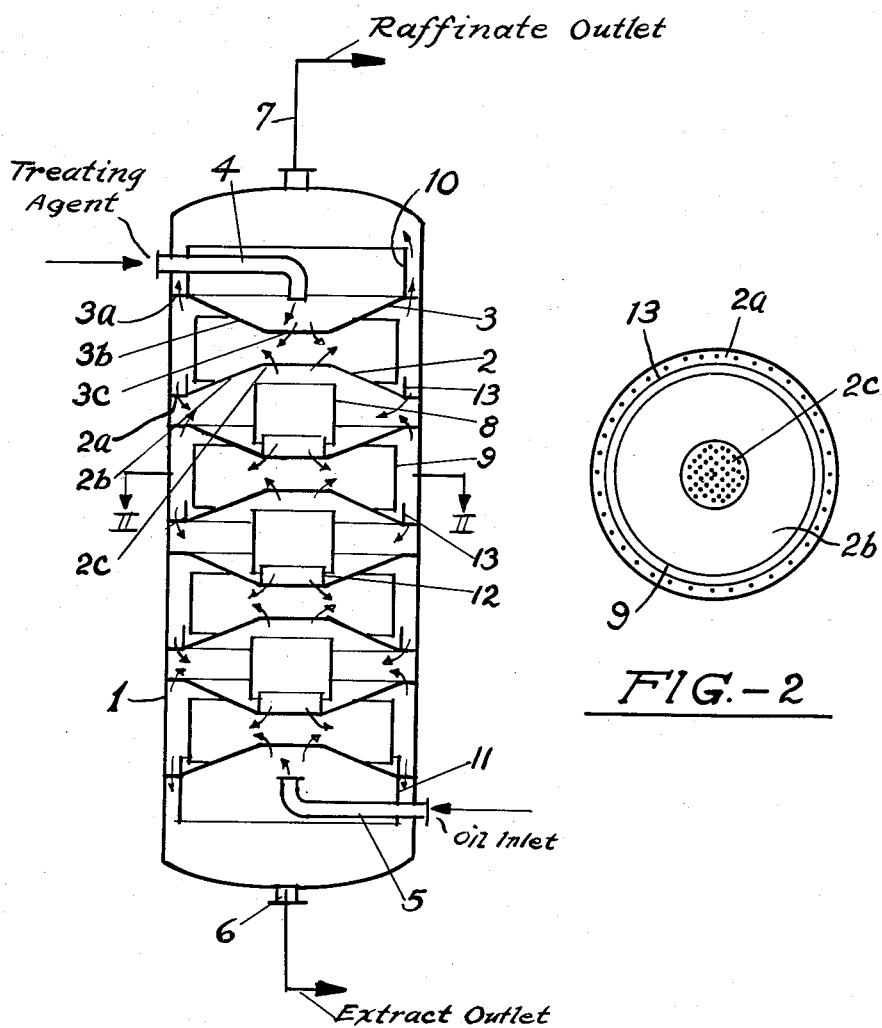

2,569,391

UNITED STATES PATENT OFFICE 2,569,391

LIQUID-LIQUID CONTACTING TOWER

Reid F. Stearns, Elizabeth, N. J., assignor to Standard Oil Development Company, a corporation of Delaware Application February 19, 1948, Serial No. 9,532

4 Claims. (Cl. 23—270.5)

The present invention relates to a method and apparatus for contacting two substantially immiscible liquids, or liquid mixtures, solutions and the like, of dissimilar density or specific gravity, by countercurrent flow through a contacting tower or chamber. It is an object of the invention to provide a method and means by which the conventional opposed flow relationship of such a system is modified so that, while countercurrent flow through the tower is maintained a simultaneous concurrent flow relationship is produced in a series of zones arranged in groups from top to bottom of the contacting tower or chamber.

Countercurrent treating or contacting systems primarily depend upon the differential density of two liquids to create countercurrent flow thereof through a treating tower or chamber. Various method and apparatus expedients have been utilized to facilitate contact between the respective liquids and to avoid emulsification and entrainment of one or the other of such liquids. The systems previously employed generally have been deficient in their failure to provide adequate mixing or efficient contact between the liquids without the risk of emulsification or excessive entrainment and recycling of one liquid or the other. In part, such deficiencies have been due to space limitations which are imposed upon the construction of the towers or chambers utilized, and the fact that the flow of liquids through the contact zones necessarily has been at a substantially constant velocity without regard for the different conditions required for mixing and separation stages in such a system.

The systems now in use may be divided into two main types:

1. Those in which either the heavy liquid or the light liquid is contacted as a dispersed phase with the other as the continuous phase.

2. Those in which both liquids are dispersed when brought into contact.

Of these two types, the second provides greater contact surfaces between the liquids, but is more subject to operating difficulties due to emulsification and entrainment. It is an object of the present invention to obtain optimum results by dispersed phase contact between two substantially immiscible liquids of dissimilar specific gravities, while substantially avoiding the normal difficulties of emulsification and entrainment.

The invention and its objects may be more fully understood from the following description when it is read in conjunction with the accompaying drawings, in which:

Fig. 1 is a diagrammatic showing, in vertical section, of a contacting tower according to the invention.

Fig. 2 is a cross sectional view through the tower of Fig. 1, along the line II—II.

Referring now to the drawings, the numeral 1 designates a vertical tower or chamber in which may be performed a liquid to liquid contacting operation of the character contemplated. For the purpose of illustration, this may be considered as an operation in which an acid treated oil is to be neutralized with caustic soda solution, or in which the neutralized oil is to be washed with water. The method and apparatus is, of course, also adapted for use in any comparable treating or contacting operation, as for example the extraction of oils with phenols or other solvent materials which are substantially immiscible with the material to be treated, and of dissimilar density or specific gravity.

Within the tower 1 are disposed a vertical series of lateral plate members 2 and 3, each of which is peripherally joined to the tower wall in fluid tight relation thereto. Each member 2 is composed of an annular portion 2a, by which it is joined to the tower wall, a hollow frusto-conical portion 2b, secured at its base edge to the inner edge of portion 2a, and a closure portion 2c for the smaller open end of the frusto-conical portion 2b, all of such portions being concentric with the tower and with each other. Each member 3 is similarly composed of comparable portions 3a, 3b, and 3c. The annular portions 2a and 3a, and the closure portions 2c and 3c are perforated to provide a plurality of passageways through such portions of the plate. An inlet 4, for the heavier of the two liquids passed through the tower, is provided above the uppermost plate member, and an inlet 5 below the lowermost plate member for the lighter of said liquids. Outlets from the tower, as designated by numerals 6 and 7, are for the respective liquids after contact in passing through the tower from plate to plate by way of the passageways provided in the several plates 2 and 3. Preferably the total area of the passageways in the annular or circumferential portions 2a and 3a is substantially equal to the total area of the passageways in the closure elements 2c and 3c, but this area relationship may be varied within any one plate, or from plate to plate in any manner which may be required to obtain any desired volume flow relationship between the liquids passed through such passageways and through the tower. By such means, also, the velocity of the liquids passing through the passageways may be adjusted to produce any desired degree of fineness in the dispersion issuing from said passageways.

As shown, and as described, the plates 2 and 3 are substantially identical. The alternate plates 3, however, are disposed with the frusto-conical portions 3b in inverted position. By such arrangement, the central portions 2c and 3c, and the annular portions 2a and 3a, are alternately brought into closely and widely spaced relationship, so that the liquid flowing upwardly through the passageways of one portion is discharged into dispersed, intimate contact with a dispersion of the liquid flowing downwardly through the passageways of a corresponding portion of the plate above. Also, by such alternate arrangement of the plates, between each pair of plates there is formed a concentric group of mixing, separation and discharge zones through which the liquids flow radially outward and inward from plate to plate. In each group the volume generally will increase from the mixing zone to the discharge zone. The linear rate of radial flow and particularly the velocity of flow at the outlet zone obviously depends upon the volumetric characteristics of the cylindrical section of the space between plates through which passes the total volumetric flow of liquid, and this linear rate may be varied through each group of mixing, separation and discharge zones between the respective plates by suitable selection of:

a. Plate spacing at the mixing and discharge zones, including vertical separation of the plates, and also variation of the inclination of the side walls of the frusto-conical portions, b. The width of the circumferential perforated portions 2a and 3a, and c. The diameter of the central perforated portions 2c and 3c.

When the direction of radial flow is inward from a peripheral mixing zone, the plates 2 and 3 may be so constructed and arranged as to produce a linear rate of flow which is either less than, greater than, or equal to the rate of flow at the mixing zone. However, when the radial flow is outward, the linear rate of flow will always be less through the separation and discharge zones than at the mixing zone.

Variation of plate spacing and dimensions in the latter instance merely determines the extent of such difference in the outward flow rate.

The effect on radial flow of such variations may be calculated by use of the following formulae:

I. *Radial flow outward*

$$V_o = V_m \frac{h_m d_2}{h_o d_1}$$

II. *Radial flow inward*

$$V_o = V_m \frac{h_m d_1}{h_o d_2}$$

where:

$V_o$ is the radial velocity existing at the outlet or discharge zone, $V_m$ is the radial velocity existing at the mixing zone, $h_o$ is the distance between plates at the outlet zone, $h_m$ is the distance between plates at the mixing zone, $d_1$ is the inside diameter of the annular portion of the plates, $d_2$ is the diameter of the closure portion of the plates.

The following tables are provided to illustrate the radial flow characteristics set forth above, and particularly the effect of variations in the vertical space relationship of the plates 2 and 3. In these examples certain conditions of structure and operations are assumed, and maintained as constants in all cases. These assumptions are as follows:

a. A tower 1 having an inside diameter of 4 feet;

b. Annular plate portions 2a and 3a, each having an inside diameter of 3.83 feet (this is $d_1$ of the formulae);

c. Central closure portions 2c and 3c, each having a diameter of 1.13 feet (this is $d_2$ of the formulae);

d. A volumetric rate of flow of such magnitude that $V_m$ equals 1.00 foot per second;

e. A plate spacing at the outlet or discharge zones of 24 inches (this is $h_o$ of the formulae).

With these constants and assuming a series of values for $h_m$ of the formulae, namely the spacing of the plates at the mixing zones, the effect on radial velocity at the outlet or discharge zones is indicated as follows:

TABLE I

*Radial flow outward*

| Case | $h_m$ in. | $h_o$ in. | $V_m$ ft./sec. | $V_o$ ft./sec. |
|---|---|---|---|---|
| 1 | 5.00 | 24 | 1.00 | 0.0615 |
| 2 | 6.00 | 24 | 1.00 | 0.0738 |
| 3 | 7.08 | 24 | 1.00 | 0.0871 |
| 4 | 8.00 | 24 | 1.00 | 0.0984 |

TABLE II

*Radial flow inward*

| Case | $h_m$ in. | $h_o$ in. | $V_m$ ft./sec. | $V_o$ ft./sec. |
|---|---|---|---|---|
| 1 | 5.00 | 24 | 1.00 | 0.706 |
| 2 | 6.00 | 24 | 1.00 | 0.847 |
| 3 | 7.08 | 24 | 1.00 | 1.00 |
| 4 | 8.00 | 24 | 1.00 | 1.13 |

Again, referring particularly to the drawings, the numerals 8 and 9 designate cylindrical baffle members disposed and supported between plates in vertically spaced relation thereto and substantially defining the boundary between the separation and discharge zones. By means of such baffles, any possible entrainment of liquids, one in the other, is further avoided by impeding straight through flow and providing some degree of hold-up time from mixing zone to discharge zone. It is also desirable to prevent mixture of the contacted light and heavy liquids, leaving the top and bottom plates, with incoming fresh feed through lines 5 and 4, and for this purpose cylindrical weir members 10 and 11 may be provided, the former extending upwardly beyond the discharge end of pipe 4 at the inner edge of annular portion 3c of the inverted uppermost plate 3, while the latter depends from the lowermost plate 2 in similar fashion. In addition to the baffle members 8 and 9, cylindrical weirs 12 and 13 may be employed to further impede the flow of heavy liquid over the plates. These weirs are disposed in conjunctive relation to the corresponding baffles 8 and 9. It is to be noted, also, that while the apparatus has been illustrated by a showing in which the uppermost plate is inverted and the lowermost plate is upright, this arrangement and relationship may be reversed without substantial difference in the operating characteristics thereof. In such construction however the inlet pipes 4 and 5 should open into the annular space defined by the weir members 10 and 11.

This invention has been illustrated and described with reference to a particular embodiment thereof, but it is not intended to be limited thereby, but only by the appended claims, in which what is claimed is:

1. Apparatus for contacting two substantially immiscible liquids of dissimilar specific gravity, comprising a vertical tower, a plurality of vertically spaced transverse plate members in said tower, each consisting of a flat, annular perforate section secured peripherally to the tower wall a concentric, hollow, frusto-conical section joined at its base portion to the inner edge of said annular section, and a flat perforate closure section for the apex end of said frusto-conical section, alternate plates being disposed with the frusto-conical section in an inverted position and the respective perforate sections alternately in contiguous relationship, any pair of plates defining between them a concentric series of mixing, separation, and discharge zones, conduit means for introducing the heavier of two substantially immiscible liquids into the tower above the uppermost plate therein, and for separately removing the lighter liquid therefrom, and conduit means for introducing the lighter of said liquids into the tower below the lowermost plate therein, and for separately removing the heavier liquid therefrom, whereby movement of said liquids is vertically countercurrent through said tower, and radially concurrent through said mixing, separation and discharge zones between plates.

2. In a liquid contacting tower, a transverse plate member comprising a perforated flat annular portion secured peripherally to the tower wall, a concentric, hollow, frusto-conical portion joined at its base to the inner edge of said annular portion, and a perforated closure portion for the smaller opening in said frusto-conical portion.

3. A plate member according to claim 2, in which the total area of the perforations in said annular portion is substantially equal to the total area of the perforations in said closure portion.

4. A liquid contacting apparatus, comprising a vertical tower, a plurality of vertically spaced transverse plate members in said tower, each consisting of an annular perforated portion secured peripherally to the tower wall, a concentric, hollow, frusto-conical portion joined at its base to the inner edge of the annular portion, and a perforated closure portion for the smaller end of said frusto-conical portion, alternate plate members being disposed in inverted position, between each pair of plates a cylinder baffle disposed concentrically therewith in longitudinally spaced relation to each plate member, substantially defining a discharge zone between said plates in the area of their greatest separation, said zone opening upwardly and downwardly through the discharge passageways formed in the corresponding perforated portions of said pair of plates, a cylindrical weir secured to each plate substantially at the junction of a frusto-conical portion with a downwardly opening perforated portion, and extending upwardly into each discharge zone concentric with, and in radially spaced relation to the defining baffle for said zone, cylindrical weirs secured to the top and bottom plate members extending upwardly and downwardly from the respective plates adjacent the outlets of the discharge passageways therethrough, substantially defining inlet and outlet areas at each end of the tower, inlet conduit means for a liquid discharging into each of said inlet areas, and outlet means opening from the upper and lower ends of said tower beyond said inlet means.

REID F. STEARNS.

REFERENCES CITED

The following references are of record in the file of this patent:

UNITED STATES PATENTS

| Number | Name | Date |
|---|---|---|
| 634,751 | Hofmann | Oct. 10, 1899 |
| 1,738,766 | Duncan | Dec. 10, 1929 |
| 2,139,589 | Ittner | Dec. 6, 1938 |
| 2,154,144 | Albin | Apr. 11, 1939 |
| 2,460,019 | Long et al. | Jan. 25, 1949 |